March 19, 1940.  J. R. SHEPPARD  2,193,988
ARTIFICIAL TEETH CARRIER
Filed Dec. 23, 1938
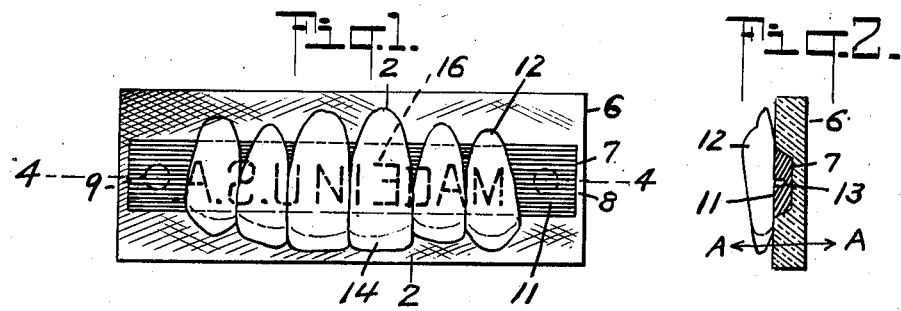
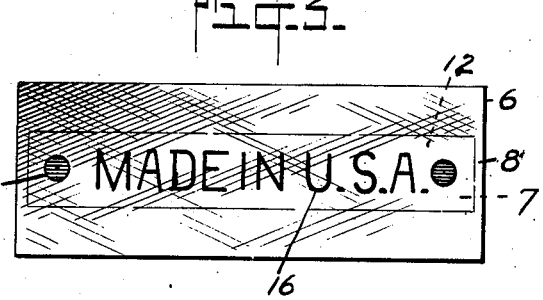
INVENTOR
JOHN R. SHEPPARD.
BY
ATTORNEY Patented Mar. 19, 1940

2,193,988

UNITED STATES PATENT OFFICE 2,193,988

ARTIFICIAL TOOTH CARRIER

John R. Sheppard, New York, N. Y., assignor to The Dentists' Supply Company of New York, New York, N. Y., a corporation of New York Application December 23, 1938, Serial No. 247,326

3 Claims. (Cl. 206—83)

This invention relates to an artificial tooth carrier, and has particular reference to a type of carrier for better observing the teeth placed thereon without removal therefrom.

Artificial tooth carriers are used for mounting sets of teeth, and when so mounted, are usually placed with their sides abutting in the drawer or cabinet of the dentist, and when matching teeth with others of a patient, it has been customary for the dentist to remove the carrier and to then remove the teeth from the carrier to compare them with the teeth of the patient. These teeth are also sold over the counter in the dentists' supply houses, and with types of carriers heretofore used, it has been impossible to determine light effects and particularly translucency of the teeth themselves without removing the teeth from the carrier.

In providing carriers for teeth, they must be of sufficient width, so that the entire tooth will lie within the periphery thereof to prevent dislodgement of the teeth from the carrier, and, therefore, with artificial teeth more closely resembling natural teeth, particularly as to translucency, it has heretofore been impossible to observe this translucency without removal of the teeth from the carrier.

The object of the present invention is to provide a tooth carrier which will permit light to pass therethrough, so that translucent areas in the teeth may be observed without removal of the teeth from the holder.

A further object of the invention is to provide a transparent tooth carrier in which special means are provided for retaining the teeth securing medium thereon.

According to the invention, the artificial tooth carrier comprises a plate of transparent material provided with means held thereon for attaching teeth thereto, the transparency of said plate permitting light to pass therethrough whereby translucent areas in said teeth may be observed without removal of said teeth from said holder.

The drawing illustrates an embodiment of the invention, and the views therein are as follows:

Figure 1 is a top plan view of the carrier embodying my invention, and shows a group of teeth attached thereto, Figure 2 is a vertical sectional view taken on the line 2—2 of Figure 1, Figure 3 is a rear view of the carrier, Figure 4 is a longitudinal sectional view taken on the line 4—4 of Figure 1, and Figure 5 is a perspective view showing a modified form of plate.

As illustrated in Figure 1, 6 represents the plate. This plate is provided with a longitudinal groove 7 which may be shouldered, as at 8, on the ends of said groove. The groove may be provided with holes 9 for better retaining in said groove a wax or other mouldable material plate 11. The teeth 12 are secured to this mouldable plate 11; some of the teeth are provided with pins 13, while others have cavities therein presenting points which pierce the mouldable material, and are thus retained thereon.

It is, of course, essential that the width of the plate 6 be greater than the overall dimension of the teeth 12, so that in handling, and in storing these carriers side to side, the teeth thereon will not be accidentally dislodged.

In the teeth shown in Figures 1 and 2 of the drawing, there is indicated tips or incisal areas 14 of translucent material. These teeth have been made to simulate natural teeth which have the same virtues, and with carriers heretofore used, it has been impossible to observe the translucency of the incisal edges of the teeth without removing the teeth from the holder.

Wooden and metal plates containing mouldable material have been heretofore used, but in these instances, it will be readily understood that the light will not be permitted to penetrate through the area indicated by the line A—A, because the carrier itself has always been opaque.

With this type of tooth carrier, however, the light may pass through the plate 6 of the carrier, and, therefore, through the incisal area 14, so that it can be readily observed by the purchaser or technician.

In order to retain the mouldable material, such as wax, in the groove 7 of the transparent plate, lettering 16, either raised or depressed, may be located in the bottom of said groove, and may be formed backward, so as to be apparent and readily readable from the rear of the carrier. This lettering may be as shown, or may provide the necessary patent information for constructive notice.

It will be seen from Figures 1 and 2 of the drawing that the incisal area of each tooth lies close to the undisturbed transparent part of the carrier base so that the incisal edges 14 may be examined to determine the translucency of the incisal edges 14 without removing the teeth from the carrier. Of course, all the teeth on the carrier must have their parts within the boundary edges of the carrier otherwise the teeth would be knocked therefrom in handling.

Figure 4 shows a section through the letters where parts of the letters are raised into sharp contacting points for holding the material.

If desired, the bottom of the groove may be provided with a series of holes 9, or small protuberances 17, (see Figure 5). In production, it may sometimes be deemed more expeditious to roll the mouldable material, such as wax, into a continuous line of plates 6, and, therefore, the groove 7 may be cut clear through the plate from end to end, as shown in Figure 5.

The plates used in this tooth carrier may be of glass, certain forms of cellulose acetate, or other material which will allow the light to pass therethrough for observing the translucent areas in the teeth without removal of the teeth therefrom.

Of course, the artificial tooth carrier illustrated and described herein may be modified in various ways without departing from the invention herein set forth and hereafter claimed.

The invention is hereby claimed as follows:

1. An artificial tooth carrier comprising a substantially flat transparent member, a depressed channel in said member, plastic material in said channel for holding a plurality of artificial teeth thereon, said teeth held by said plastic material having their incisal edges extending beyond the filled channel and lying relatively close to the surface of the transparent member, the transparency of said member permitting light to pass therethrough whereby the incisal edges of said teeth may be observed to determine their translucency.

2. An artificial tooth carrier comprising a substantially flat transparent member, a depressed channel in said member, plastic material in said channel for holding a plurality of artificial teeth thereon, means for retaining said plastic material in said channel, said teeth held by said plastic material having their incisal edges extending beyond the filled channel and lying relatively close to the surface of the transparent member, the transparency of said member permitting light to pass therethrough whereby the incisal edges of said teeth may be observed to determine their translucency without removal of said teeth from said carrier.

3. An artificial tooth carrier comprising a substantially flat transparent member, a depressed channel in said member, plastic material in said channel for holding a plurality of artificial teeth thereon, means at the bottom of said channel for retaining said plastic material therein, said teeth held by said plastic material having their incisal edges extending beyond the filled channel and lying relatively close to the surface of the transparent member, the transparency of said member permitting light to pass therethrough whereby the incisal edges of said teeth may be observed to determine their translucency without removal of said teeth from said carrier.

JOHN R. SHEPPARD.